March 5, 1968  A. S. CORDIO ET AL  3,371,385
INJECTION MOLD ASSEMBLY WITH MEANS FOR
SHEARING SPRUE FROM FINISHED ARTICLE
Filed March 8, 1966  2 Sheets-Sheet 1
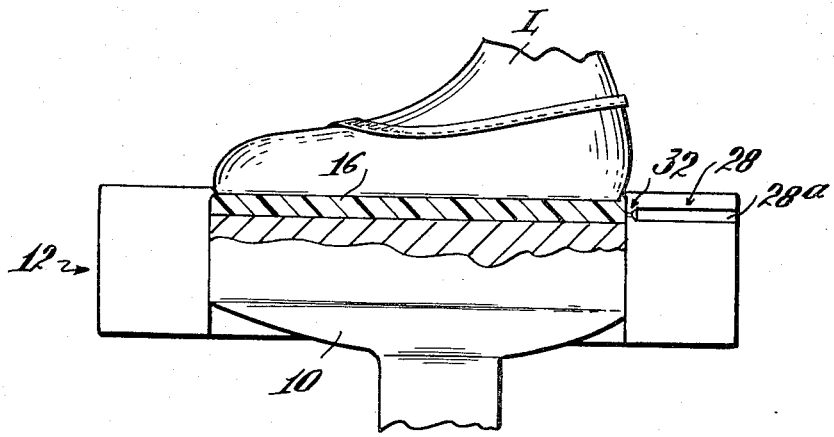
Fig. 1
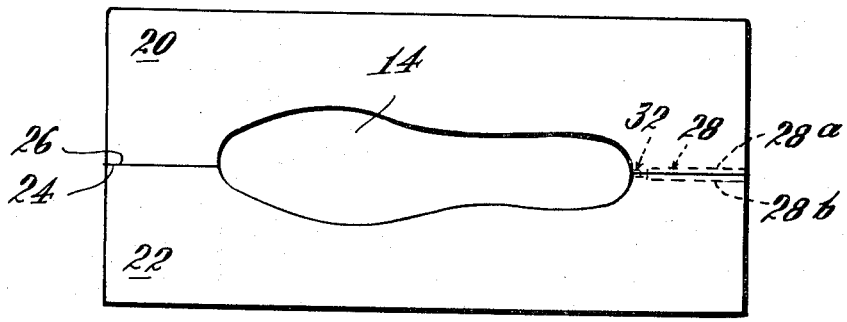
Fig. 2
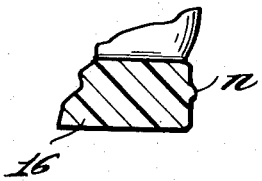
Fig. 3a
Fig. 3b
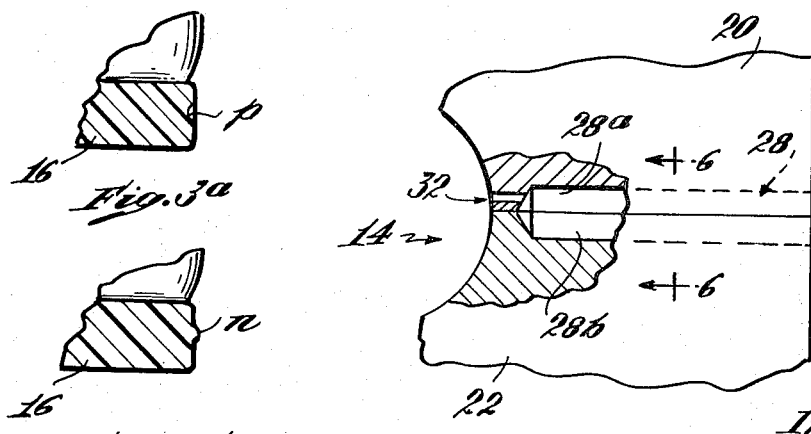
Fig. 3
Inventors
Anthony S. Cordio
George F. Mairle
by Roberts, Cushman & Grover
Attys United States Patent Office 3,371,385
Patented Mar. 5, 1968

3,371,385
INJECTION MOLD ASSEMBLY WITH MEANS FOR SHEARING SPRUE FROM FINISHED ARTICLE
Anthony S. Cordio, Fitchburg, and George F. Mairle, Waltham, Mass., assignors to International Vulcanizing Corporation, Waltham, Mass., a corporation of Massachusetts
Filed Mar. 8, 1966, Ser. No. 532,672
6 Claims. (Cl. 18—30)

This invention relates to injection molding and especially to applying bottoms of an elastomeric material to the bottoms of footwear by injection molding.

The mold assembly employed for such bottom-forming operations generally comprises a sole plate and mold ring which constitute the bottom and side wall of a mold cavity for receiving an elastomer to form a bottom of the desired shape. The side ring is split longitudinally and the confronting faces of the ring halves are provided with grooves which collectively form an injection passage through the ring directly into the mold cavity. When the ring halves are separated to permit the finished shoe to be removed, the sprue piece formed in the passage between the injection apparatus and the mold cavity is left unsupported and since the newly formed bottom is still tender, may tear away part of the edge leaving a pit therein. Alternatively, the sprue itself may break off close to the edge leaving an undesirable nub. On the one hand, the pit must be filled and on the other hand the nub must be removed.

The principal objects of this invention are to provide a mold assembly designed automatically to remove the sprue attached to the edge without tearing the edge or leaving a pit or nub; to provide a mold assembly embodying means for automatically removing the sprue at the end of each bottom-forming operation at the moment of separation of the ring halves; and to provide a mold assembly embodying means for automatically removing the sprue without substantial modification of the assembly itself and without in any way interfering with normal injection procedure or the manipulation and/or maintenance of the assembly.

In accordance with the invention the injection mold assembly comprises a sole plate and mold ring which constitute the bottom and side wall of a mold cavity for receiving an elastomer to form a bottom having a tread surface and a peripheral edge. The mold ring embodies side wall parts separable to permit removing the finished article and two of the side wall parts contain at their interfaces grooves which collectively form an injection passage part way through the side wall. A conductor extends from the passage the remainder of the way through the side wall through which the elastomer supplied to the passage enters the mold cavity. The conductor terminates at the interior surface of the side wall and is operable, by relative movement of the parts when they are separated to free the article from the mold, to shear the sprue from the edge of the formed bottom at its place of junction therewith. The conductor is embodied in one of the parts exclusively of the other so that relative movement of the parts during separation moves the conductor and the sprue contained thereby in shearing relation to the edge of the bottom. In one form the conductor is located entirely in one of the parts and comprises a small diameter orifice extending from the injection passage in the one part through the part into the mold cavity. Alternatively, a hollow tube is recessed into the confronting faces of the parts with one end in communication with the injection passage and the other with the cavity, and there is means fixing the tube to one of the parts.

The invention will now be described in greater detail with reference to the accompany drawings wherein:

FIG. 1 is an elevation of a mold assembly showing one half of the mold ring, the sole plate partly in section and a finished shoe;

FIG. 2 is a plan view of the mold assembly shown in FIG. 1 with the shoe omitted;

FIG. 3 is an enlarged fragmentary plan view of the heel end of the mold assembly shown in FIG. 2, broken away in part to show the means for shearing the sprue located adjacent the inner end of the injection passage;

FIG. 3a is a fragmentary elevation at the heel end of a shoe showing the bottom partly in section, and showing a pit formed by pulling the sprue away from the edge;

FIG. 3b is a fragmentary elevation at the heel end of a shoe showing the bottom partly in section, and showing a nub formed by pulling the sprue away from the edge;

Figure 4:
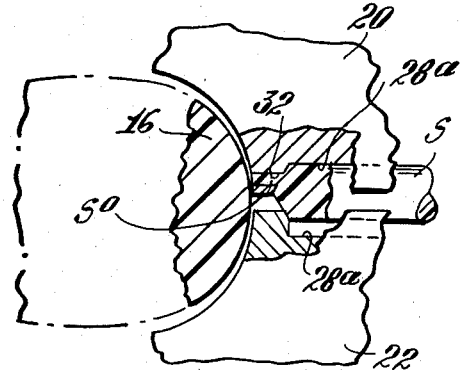
FIG. 4 is a plan view corresponding to FIG. 3, showing the mold parts partially separated and partial shearing of the sprue from the heel end of the shoe bottom.

Referring to the drawings (FIGS. 1 and 2), there is shown a mold assembly comprising a sole plate 10 and a mold ring 12 which constitute the bottom and side wall of the mold cavity 14 for receiving an elastomer to form a sole 16 at the bottom of a lasted upper held against the top of the mold ring by a last L. The sole plate is supported for movement relative to the mold ring and bottom of the last to enable forming a sole of the desired thickness. The mold ring 12 is separable longitudinally along the median line of the mold cavity, the mold halves 20 and 22 being supported for movement relative to each other with their parting or confronting surfaces 24, 26 held engaged during injection of the bottom-forming composition into the mold cavity to form the bottom.

In accordance with this invention, the mold ring is provided with an injection passage 28 comprised of grooves 28a and 28b in the confronting faces 24 and 26 which extend part way through the wall of the ring, and a conductor 32 which extends from the inner end of the injection passage 28 the remainder of the way through the side wall into the mold cavity, through which elastomer supplied to the injection passage 28 enters the mold cavity. The conductor 32 in the preferred form of the invention is a relatively small-diameter hole or orifice drilled through the wall of the mold ring from the injection passage 28 into the mold cavity and is confined exclusively to one of the halves of the mold ring, to wit, the half 20 as illustrated in FIG. 3. One end of the conductor is in communication with the injection passage 28 and the other end is in communication with the mold cavity 14.

As thus constructed, elastomer introduced under pressure to the injection passage 28 will flow through the conductor 32 into the mold cavity at one side of the confronting faces of the mold halves and when the mold halves are separated relative to each other to release the finished shoe, the relatively short small-diameter sprue piece which is contained within the conductor 32 will be sheared off the edge of the newly formed bottom thereby eliminating a possible pit *p* (FIG. 3*a*) or nub *n* (FIG. 3*b*). Since the conductor 32 is relatively short, the portion so contained therein can be easily extracted by pulling on the larger portion of the sprue which has been freed by separation of the halves of the mold ring.

Although the conductor 32 is eccentric with respect to the confronting faces of the mold halves, it is relatively small in diameter and so close to the dividing plane that shearing action is substantially at right angles to the plane of junction of the sprue with the edge of the bottom. A relatively clean shear is thus obtained.

Figure 5:
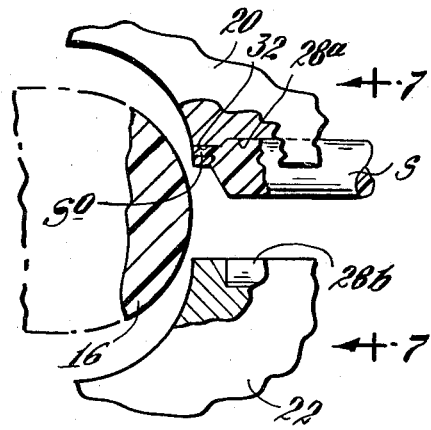
FIG. 5 is a view corresponding to FIG. 4, showing the mold halves completely separated and a sprue completely sheared from the sprue bottom.
Figure 6:
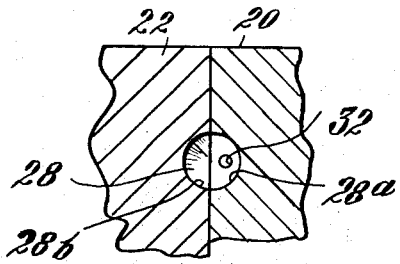
FIG. 6 is a vertical section taken on the line 6—6 of FIG. 3.
Figure 7:
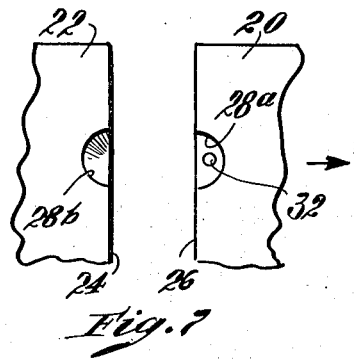
FIG. 7 is a vertical section taken on the line 7—7 of FIG. 5.
Figure 8:
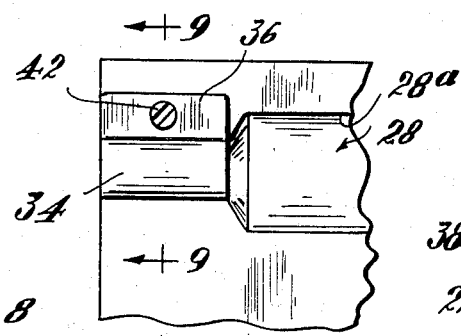
FIG. 8 is a fragmentary elevation showing an alternative means for shearing the sprue in the form of a short tube which is removably fixed to one of the halves of the mold ring.
Figure 9:
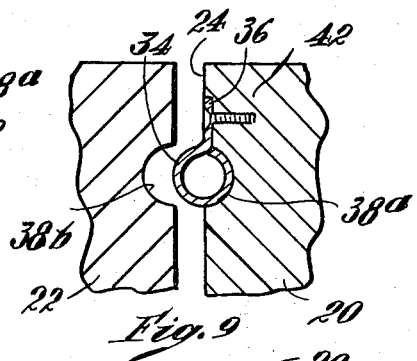
FIG. 9 is a section taken on the line 9—9 of FIG. 8, showing both halves of the mold ring.

Alternatively, a relatively short small-diameter tube 34 is recessed into the confronting surfaces of the mold halves between the injection passage 28 and the interior of the mold cavity as shown in FIGS. 8 and 9. The tube is provided with a radial flange 36, one-half being received by a recess 38*a* in the half 20 and the other half by a recess 38*b* in the half 22. The flange 36 is recessed into the face 24 above the recess 38*a* and a screw bolt 42 provides for fastening the tube to the part 20. The tube is preferably ¼ to ½ inch in length, has an inside diameter in the order of .071" and its inner end is substantially flush with the inner surface of the mold cavity where it enters the cavity. As illustrated in FIGS. 8 and 9, the tube 34 is formed by rolling a flat piece of metal on itself in such fashion as to provide the radial flange 36 extending lengthwise thereof. The inner end of the tube provides a shear member substantially like that provided by the inner end of the conductor 32 shown in FIGS. 3 to 5, but with the advantage that it is concentric with the axis of the injection passage and symmetrical with respect to the parting faces so that the injection is obtained at the center and shearing action is somewhat sharper and cleaner.

Figure 10:
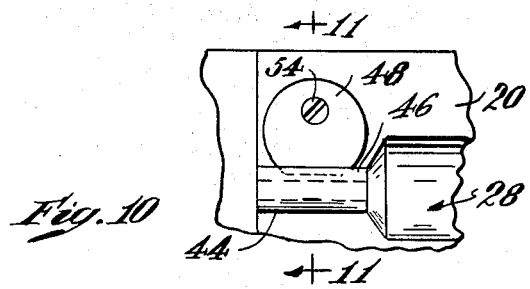
FIG. 10 is a fragmentary elevation of a shear tube similar to that shown in FIGS. 8 and 9, but with a modified attaching flange which is recessed into the confronting faces of both mold halves.
Figure 11:
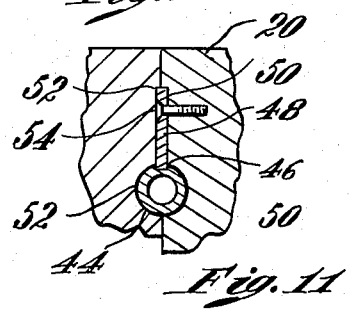
FIG. 11 is a section taken on the line 11—11 of FIG. 10, showing both halves of the mold ring.

FIGS. 10 and 11 show a modification in which a seamless tube 44 is employed containing a milled slot 46 lengthwise thereof. A washer 48, one side of which has been milled off, is set into the slot in radial relation to the axis of the tube and provides means for fastening the tube to the mold half. In this form of the invention the confronting faces 24, 26 of the mold halves each contain a recess 50 and 52 for receiving one-half each of the tube and of the washer 48 and the latter is secured to the mold half 20 by a screw bolt 54.

The essential feature of the invention resides in the provision of means adjacent the inner end of the injection passage, through which the bottom-forming composition enters the mold cavity, which is in the form of a relatively short small-diameter orifice for conducting the elastomer from the injection passage into the mold cavity and which is movable with one of the mold halves to effect movement of the sprue contained therein in such fashion as to shear it from the edge of the bottom with its junction therewith.

The invention is described herein with reference to a simple mold assembly in which a single injection passage is provided in the mold ring and a one-piece sole is applied to the bottom of the lasted upper. It is to be understood however that the invention is in no way restricted to such apparatus but may be used with mold assemblies designed for double injection wherein there is an injection passage extending through the mold ring directly into the mold cavity and another injection passage through the mold ring which is adapted to be placed in communication with an injection passage in the sole plate by movement of the latter to provide for injection of the elastomer through the sole plate into the mold cavity.

It should be understood that the present disclosure is for the purpose of illustration only and that this invention includes all modifications and equivalents which fall within the scope of the appended claims.

We claim:

1. In an injection mold assembly for applying bottoms to footwear, a sole plate and mold ring which constitute the bottom and side wall of the mold cavity for receiving an elastomer to form a bottom having a tread surface and a peripheral edge, said mold ring embodying side wall parts separable to permit removing the finished article, two of said side wall parts containing at their interfaces grooves which collectively form an injection passage part way through the side wall; a conductor extending from the passage the remainder of the way through the side wall through which elastomer supplied to the passage enters the mold cavity, said conductor terminating at the interior surface of the side wall, said conductor being embodied in one of the parts exclusively of the other and being operable, by relative movement of the parts, when they are separated to free the article from the mold, to shear the sprue from the edge of the formed bottom at its place of junction therewith.

2. An injection mold assembly according to claim 1, wherein the injection passage extends the major portion of the way through the side wall and the conductor is relatively short and small in diameter.

3. Injection apparatus according to claim 1, wherein the conductor is a small diameter orifice extending from the half of the injection passage in one of the parts through said part into the mold cavity, said orifice being located eccentrically with respect to the interfaces.

4. Injection apparatus according to claim 1, wherein the conductor is a hollow tube recessed into the interfaces of the parts and fixed to one of the parts for movement therewith with one end in communication with the injection passage and the other with the interior of the mold cavity.

5. Injection apparatus according to claim 1, wherein the conductor is a small diameter hollow tube recessed into the interfaces of the parts with one end in communication with the injection passage and the other with the interior of the cavity, and there is means removably attaching the tube to the one part.

6. Injection apparatus according to claim 1, wherein the conductor is a small diameter hollow tube having a flange extending radially from its surface, said interfaces of the parts containing recesses for receiving the tube and flange, and there is means fastening the flange to one of the parts.

References Cited

UNITED STATES PATENTS

| 2,520,263 | 8/1950 | Vinal | 18—42 X |
| 2,494,777 | 1/1950 | Patterson et al. | 18—42 |
| 2,976,570 | 3/1961 | Ettenberg | 18—42 |

FOREIGN PATENTS

| 549,556 | 11/1922 | France. |
| 866,792 | 6/1941 | France. |
| 872,101 | 7/1961 | Great Britain. |

WILBUR L. McBAY, *Primary Examiner.*